(No Model.)

J. W. LESLIE.
TRAVERSE RING.

No. 479,713. Patented July 26, 1892.

WITNESSES:
Charles W. Rugg.
Leonard C. Spinney

INVENTOR:
James W. Leslie

UNITED STATES PATENT OFFICE.

JAMES W. LESLIE, OF EVERETT, ASSIGNOR TO THE LESLIE MANUFACTURING COMPANY, OF BOSTON, MASSACHUSETTS.

TRAVERSE-RING.

SPECIFICATION forming part of Letters Patent No. 479,713, dated July 26, 1892.

Application filed January 23, 1892. Serial No. 419,093. (No model.)

*To all whom it may concern:*

Be it known that I, JAMES W. LESLIE, a citizen of the United States, residing at Everett, in the county of Middlesex and State of Massachusetts, have invented a new and useful Improvement in Traverse-Rings, of which the following is a specification.

This invention relates to traverse-rings, and has for its object to provide the same with friction-rollers of large diameter, whereby great freedom of motion may be obtained. In accordance with this invention, the ring, which will be hollow or tubular, is made of two separate parts, one of which comprises more and the other less than half a circle. The friction-rollers, which are made considerably larger in diameter than the diameter of the tubular or hollow parts of the ring, are mounted on bearings or axles, which are suitably supported by means contained within the hollow parts of the ring.

Figure 1:
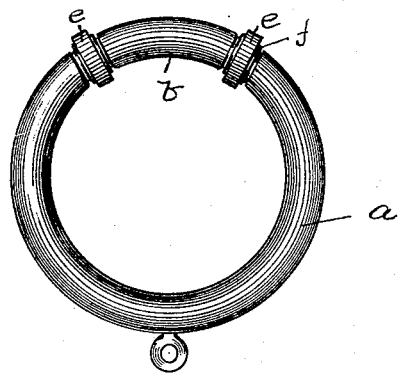
Figure 3:
Figure 2:
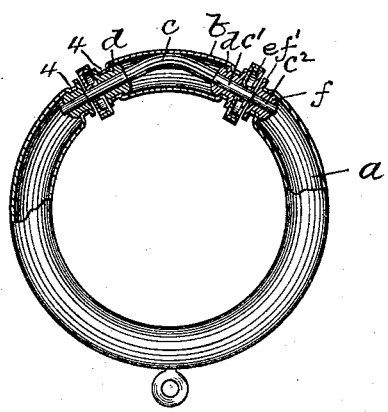
Figure 4:
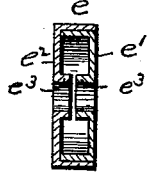

Figure 1 shows in front elevation a traverse ring embodying my invention; Fig. 2, a similar view to Fig. 1, the upper part of the ring being broken away to show in vertical section the friction-rollers and their supports; Fig. 3, a detail of a bent or curved rod or bar which has formed on it at the ends the portions which constitute the axles for the rollers, and Fig. 4 an enlarged vertical section of one of the friction-rollers.

The ring is composed of two hollow or tubular parts $a$ $b$, the part $a$ comprising about three-fourths and the part $b$ considerably less than one-fourth of the complete ring. A curved or bent rod or bar $c$ of suitable shape and area in cross-section to enter the hollow part $b$ of the ring is made somewhat longer than the part $b$ and is reduced in diameter for a short distance near each end, as at $c'$, and again reduced in diameter for a short distance at each end, as at $c^2$, thereby presenting shoulders 2 2 at the junction of the reduced portions $c'$ with the main body of the bent bar and also presenting shoulders 3 3 at the junction of the reduced end portions $c^2$ with the reduced portions $c'$. Blocks $d$, one for each end of the rod or bar, are provided, they being made alike, or substantially so, and each comprises a body portion of suitable diameter to snugly fit within the hollow end of the part $b$ of the ring and a flanged end, which is adapted to bear against the end of said part $b$. These blocks $d$ each have a hole through them centrally, whereby they may be firmly placed or driven onto the reduced portions $c'$ of the bar $c$, abutting against the shoulders 2. The blocks $d$ are made of suitable length, so that when placed in their proper positions, abutting against the shoulders 2, the flanged ends will abut against the ends of the part $b$. Two friction-rollers $e$ are provided, which are made alike, or substantially so, each comprising two caps, as $e'$ $e^2$, formed to snugly fit one within the other to thereby form a light yet durable roller and one capable of sustaining considerable weight. As these two caps $e'$ $e^2$ are made of quite thin material, it is necessary to provide additional bearings or portions which contact with the axles, and hence at the center of each cap, where the hole is formed for the axle, an annular flange $e^3$ is formed at and concentric with said hole, which projects inwardly for a short distance. The friction-rollers, while preferably being made in this way, may be made in any other suitable way, or they may be solid. The friction-rollers are placed on the reduced portions $c'$ of the bent bar, abutting against the ends of the blocks $d$. The friction-rollers are made quite large in diameter, as will be observed, as compared with the ring, and are made of such thickness that when placed on said reduced portions $c'$ and abutting against the ends of the blocks $d$ will not quite reach the shoulders 3. The hole through the friction-rollers is of the proper size to permit said rollers to revolve freely, but not to wabble. Blocks $f$, one for each end of the bent rod or bar $c$, are provided, they being made alike or substantially so, and also made similar to the blocks $d$, comprising a body portion of suitable diameter to fit snugly into the hollow ends of the part $a$ of the ring, and having flanged ends $f'$, which abut against the ends of the said part $a$. The blocks $f$ are placed or driven onto the reduced ends $c^2$ of the bent rod or bar $c$ until the flanged ends thereof abut against the shoulders 3, and to secure said blocks in position the tips of said reduced ends $c^2$ are upset. The part $a$ of the ring is slightly sprung out to admit the part $b$, with the rod $c$, contained within it, and having thereon the block $d$, friction-rolls $e$, and blocks $f$, so that the said blocks $f$ may enter the hollow ends of said part $a$.

To firmly secure the blocks $f$ within the hollow ends of the part $a$ of the ring, and also to firmly secure the part $b$ in position between the flanged ends of the blocks $d$, all the blocks are provided with circumferential grooves 4, and the material of the parts $a$ and $b$ is sunken into the said grooves, either completely around the blocks or at suitable points thereof.

When the parts are assembled, it will be seen that the friction-rollers are furnished with axles (the reduced portions $c'$) of sufficient length to give them the utmost freedom of motion, and by reason of the shoulders 3 the blocks $f$ cannot be driven onto the ends of the rod or bar to in any way impede this free movement of the rollers.

While special advantages may be derived by having the friction-rollers turn loosely on a non-rotatable axle, I do not desire to limit my invention to such particular construction; nor do I desire to limit my invention to the particular shape of the blocks, so long as they subserve the desired functions.

I claim—

1. A traverse-ring composed of two tubular curved parts $a\ b$, friction-rolls located between the adjacent ends of said parts $a\ b$, axles for said friction-rolls, and supports for said axles, contained within the hollow ends of said parts, substantially as described.

2. A traverse-ring composed of two separate hollow parts $a\ b$, axles $c'$, supported by means contained within the part $b$ and having reduced end portions, and blocks on said end portions contained within the hollow ends of the part $a$, and friction-rollers on said axles, substantially as described.

3. A traverse-ring composed of two separate hollow parts $a\ b$, axles $c'$, supported by means contained within the part $b$, and blocks $f$, contained within the part $a$, and friction-rollers on said axles, substantially as described.

4. A traverse-ring composed of two separate hollow parts $a\ b$, axles $c'$, formed on the end of a rod or bar contained within the part $b$, friction-rollers on said axles, and blocks $f$ on the ends of said axles adapted to enter the hollow ends of the part $a$ and be secured therein, substantially as described.

5. A traverse-ring composed of two separate hollow parts $a\ b$, axles $c'$, blocks $d$ on said axles, which enter the hollow ends of the part $b$, friction-rollers freely revoluble on said axles, and blocks $f$ on the ends of said axles adapted to enter the hollow ends of the part $a$, substantially as described.

6. A traverse-ring composed of two separate hollow parts $a\ b$, axles $c'$, blocks $d$ on said axles, which enter the hollow ends of the part $b$, friction-rollers freely revoluble on said axles, and blocks $f$ on the ends of said axles adapted to enter the hollow ends of the part $a$ and having circumferential grooves to receive the material of the part $a$ to thereby more securely hold them in place, substantially as described.

7. A traverse-ring composed of two separate hollow parts $a\ b$, one comprising more and the other less than half a circle, a bent rod or bar $c$, contained in the part $b$, axles $c'$, formed centrally on the ends of said bent rod or bar, and friction-rollers freely revoluble on said axles, blocks $d$ on said axles to hold the rod or bar and part $b$ assembled, and blocks $f$, secured to the ends of said axles and abutting against the shoulders 3 and adapted to enter the part secured within the hollow ends of the part $a$ and thereby complete the ring, substantially as described.

8. A traverse-ring composed of the parts $a\ b$, with hollow ends, a rod or bar $c$, having reduced end portions $c'\ c^2$, presenting shoulders 2 3, and blocks $d$ on said reduced portions $c'$ abutting against the shoulders 2 and having flanged ends $d'$ abutting against the ends of the part $b$, friction-rollers on said portions $c'$, and blocks $f$ on said reduced portions $c^2$, having flanged ends which abut against the shoulders 3 at one side and against the ends of the part $a$ at the opposite side, substantially as described.

In witness whereof I have hereunto signed my name in the presence of two witnesses.

JAMES W. LESLIE.

Witnesses:
 WALTER B. SNOW,
 WALTER P. MARBLE.